United States Patent
Schmeink et al.

(10) Patent No.: US 7,185,559 B2
(45) Date of Patent: Mar. 6, 2007

(54) GEAR MECHANISM FOR TWIN SCREW EXTRUDER

(75) Inventors: Franz Schmeink, Bocholt (DE); Helmut Thewes, Bocholt (DE)

(73) Assignee: A. Friedr. Flender Aktiengesellschaft (DE)

( * ) Notice: Subject to any disclaimer, the term of this patent is extended or adjusted under 35 U.S.C. 154(b) by 182 days.

(21) Appl. No.: 11/069,460

(22) Filed: Mar. 1, 2005

(65) Prior Publication Data

US 2005/0199093 A1 Sep. 15, 2005

(30) Foreign Application Priority Data

Mar. 12, 2004 (DE) ............. 10 2004 012 569

(51) Int. Cl.
*F16H 37/06* (2006.01)

(52) U.S. Cl. ............................. 74/665 H

(58) Field of Classification Search ............. 366/83, 366/85; 425/208; 74/665 H
See application file for complete search history.

(56) References Cited

U.S. PATENT DOCUMENTS 4,679,461 A 7/1987 Mizuguchi et al.
4,899,620 A 2/1990 Schiffer
5,836,681 A 11/1998 Giani
6,234,661 B1 5/2001 Thewes

FOREIGN PATENT DOCUMENTS

| DE | 27 48 918 | 5/1979 |
| DE | 34 20 918 | 12/1985 |
| EP | 0 658 414 | 4/1999 |
| GB | 1 431 330 | 4/1976 |

OTHER PUBLICATIONS

Article "Handbuch der Kunstoff-Extrsionstechnick I Grundlagen".

*Primary Examiner*—Dirk Wright
(74) *Attorney, Agent, or Firm*—Robert W Becker & Associates; Robert W Becker

(57) ABSTRACT

A gearbox mechanism is provided for a twin screw extruder having two screw shafts disposed at an angle to one another. The gear mechanism has a multi-stage reduction gearbox, and a distribution gearbox having two output lines connectable to the screw shafts. A first output line comprises a through output shaft. An angularly movable coupling, which is fixed against rotation, is disposed in a second output line placed at the angle of the screw shafts, relative to the first output line, via the coupling. A drive gear of the reduction gearbox is disposed between, and is in engagement with, a gear on the output shaft and a gear on a partial shaft of the second output line. A reduction gearbox and distribution gearbox are disposed, without spatial separation, in a common interior space of a multi-part gearbox housing.

11 Claims, 3 Drawing Sheets

GEAR MECHANISM FOR TWIN SCREW EXTRUDER

BACKGROUND OF THE INVENTION

The present invention relates to a gear mechanism for a twin screw extruder having two screw shafts that are disposed at an angle to one another.

Drive solutions for double screw extruders are characterized in the process portion, along the drive line, by the characteristic construction, beginning with a motor, a coupling, a gear drive that is to be reduced, a distribution gearbox and the extruder shafts that are coupled on. In this connection, a reduction gearbox converts not only the torque but the speed of the drive source, which is generally embodied as an electric motor. Subsequently, the distribution gearbox simultaneously distributes the drive power, up to now without further change, at a gear ratio of i=1, to both output shafts.

A gear mechanism is known from DE 34 20 918 A1, where two conical, oppositely directed extruder screws are fixedly connected with the output shafts of an extruder gear mechanism. To connect the parallel gear mechanism axes with the crossing axes of the process portion, a universal joint is placed in an output line behind the distribution gearbox. In the main line, the distribution gearbox conveys the first half of the drive power, without changes, into the first extruder shaft. The gear mechanism stage to the second output shaft reverses only the direction of the rotational movement. A change of the mechanical parameters speed and moment does not take place due to the gear ratio i=1. Particularly problematic for the operational reliability of the known gear mechanism are the two parallel herringboned gear sets in one stage.

EP 1 008 437 A1 describes a gear mechanism for a conical gear screw extruder. Depending upon the embodiment, the output shafts rotate in the same or opposite directions. The drive means is characterized by the special, double toothed couplings, which are to be made very small. In this way, it is possible to realize the essential requirement of this double shaft gear mechanism with regard to a very large torque that is to be transmitted, and a very small axial spacing of the screw shafts. The coupling halves of the double toothed couplings have different diameters at their ends in order to achieve an inclined positioning in a very short length.

In the handbook of Plastic Extrusion Technology, Vol. 1, Fundamentals, C. Hauser Publishers, 1989, page 518, various concepts are disclosed for distribution gearboxes in twin screw machines. The types differ from one another by the number of shafts of the distribution gearbox. Gear mechanism concepts can be used having a shaft number between 2 to 5. Depending upon the axial auxiliary forces from the process portion, the prescribed axial spacing of the output shafts, and the torques that are to be transferred, these solutions offer, with regard to the respective application, possibilities for integrating the required large thrust bearings in the housing, or realizing via the power branching a specific tooth loading adapted to the tooth geometry. The important thing with all of the concepts is that no conversions are effected in the line of the main shaft, and gear ratio changes, including the required immediate reversal, are manifested only on the auxiliary branch.

It is an object of the present invention to embody a gear mechanism of the aforementioned general type in such a way that requirements for a compact and reliably operating drive mechanism are fulfilled, and in particular by means of a straightforward structural assembly with components designed in a special manner towards this end, preferably for the upper power or capacity range.

BRIEF DESCRIPTION OF THE DRAWINGS

This object, and other objects and advantages of the present invention, will appear more clearly from the following specification in conjunction with the accompanying schematic drawings, in which.

SUMMARY OF THE INVENTION

Figure 1:
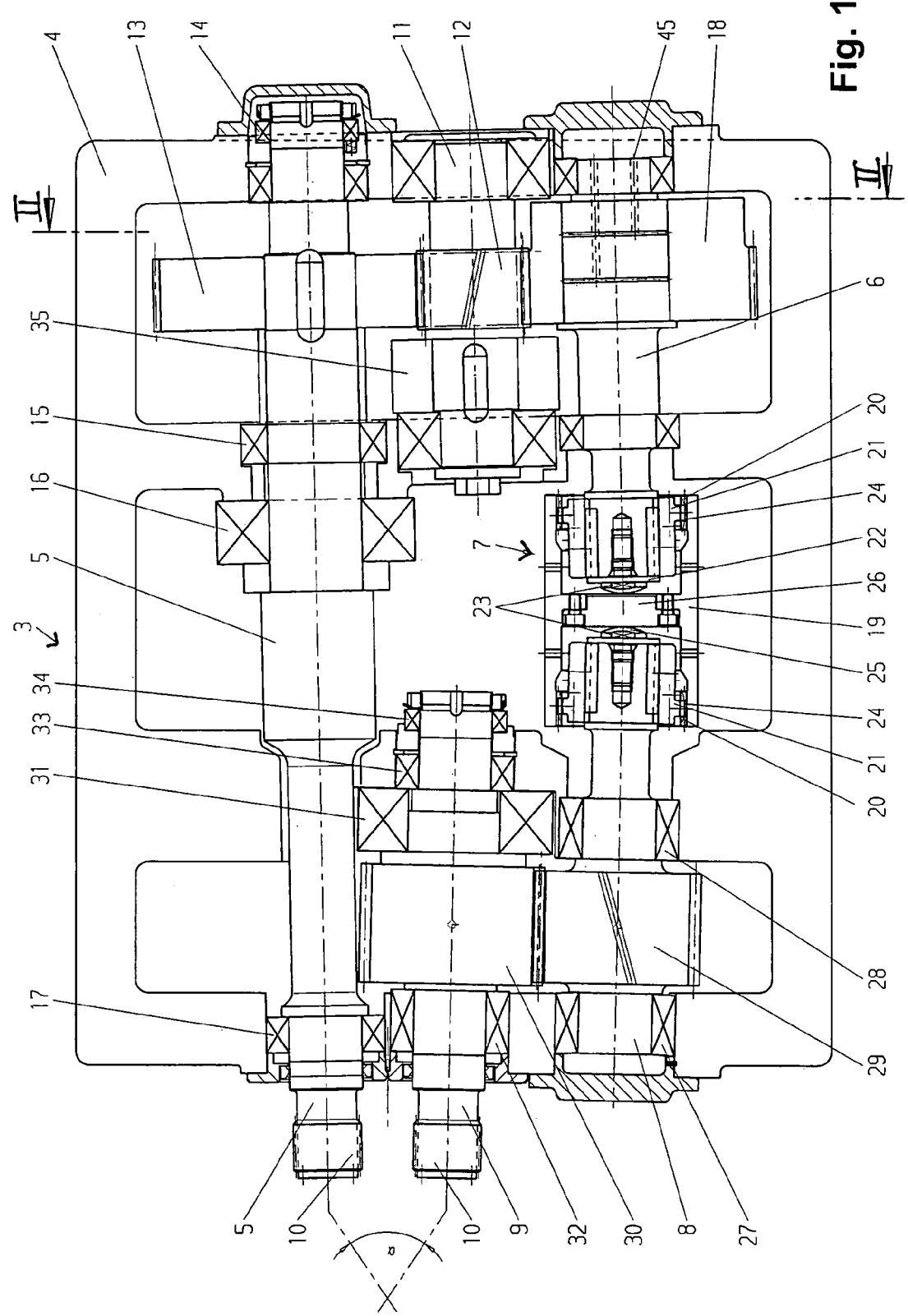
FIG. 1 is a longitudinal cross-sectional view through an inventive gear mechanism.

The gear mechanism of the present application comprises a multi-stage reduction gearbox; a distribution gearbox having two output lines connectable to the screw shafts of the gear mechanism, wherein a first output line comprises a first, continuous output shaft, wherein an angularly movable coupling, which is fixed against rotation, is disposed in a second output line, and wherein the second output line is placed at the angle of the screw shafts, relative to the first output line, via the coupling; a first gear fixedly disposed on the output shaft; a second gear fixedly disposed on a first output shaft of the second output line; a drive gear of the reduction gearbox, wherein the drive gear is disposed between, and is in engagement with, the first and second gears; and a multi-part gearbox housing, wherein the reduction gearbox and the distribution gearbox are disposed, without spatial separation, in a common interior space of the multi-part gearbox housing.

The inventive concept is characterized by a departure from the previously described known concepts having the clear spatial separation of reduction and distribution gearboxes, and is further characterized by the novel, different gear ratios between the reduction gearbox and the two output lines of the distribution gearbox.

Further specific features of the present application will be described in detail subsequently.

DESCRIPTION OF SPECIFIC EMBODIMENTS

Referring now to the drawings in detail, the gear mechanism, which is to be connected to a twin worm or screw extruder, is comprised of a reduction gear mechanism or gearbox 1, which is driven by a motor 2, and a distribution gear mechanism or gearbox 3 having two output lines. The reduction gearbox 1 and the distribution gearbox 3 are accommodated in a gearbox housing 4.

The first output line is formed by a continuous or through first output shaft 5. The second output line is comprised of a first partial shaft 6, a second partial shaft 8 that is connected with the first partial shaft 6 via a coupling 7, and a second output shaft 9. The ends of the first and of the second output shafts 5, 9 are respectively provided with a coupling toothing 10 via which the ends are to be connected with the non-illustrated screw shafts of the twin screw extruder. The screw shafts are disposed at an angle α of a conicity relative to one another that is between 1° and 3°. The two output shafts 5, 9 of the gear mechanism extend in the direction of the screw shafts, and are therefore disposed at the same angle α. In this connection, the first output shaft 5 is oriented at half the angle of the conicity relative to the ideal axis of the gearbox housing 4.

On the side of the gear mechanism that faces away from the connection to the twin screw extruder, the drive power that is applied from the motor 2 and is varied in the reduction gearbox 1 is introduced into the two output lines of the distribution gearbox 3. The output stage of the reduction gearbox 1 is formed by a shaft 11 on which is fixedly disposed an output or drive gear 12. In the illustrated embodiment, the axis of the shaft 11 is disposed above the shaft section illustrated in FIG. 1 and, for a better explanation of the embodiment, is incorporated into FIG. 1.

The drive gear 12 engages both output lines and thereby distributes the drive power to both output lines. In this connection, the shaft 11 with the drive gear 12 at the same time represents the input stage of the distribution gearbox 3. In comparison to the state of the art, this novel integration of the two functionally distinguishable gear mechanism parts, of the reduction gearbox and of the distribution gearbox, leads to a compact construction of the overall drive means for a twin screw extruder. The coupling that was previously required between the two gear mechanism parts is eliminated.

The first output line having the first output shaft 5 is driven indirectly via the drive gear 12. The drive gear 12 is provided with a tooth count of $z12$. A gear 13 that is fixedly connected with the first output shaft 5 has the tooth count of $z13$ and meshes with the drive gear 12. The toothing in this pairing, as with all other pairings of pinions and gears in the inventive distribution gearbox 3, is embodied in a helically geared manner such that the resulting axial forces of the toothing in the output shafts 5 and 9 counteract the axial operating forces from the twin screw extruder.

The first output shaft 5 is supported in the gearbox housing 4 in the bearings 14, 15, 16, 17. The bearings 14, 15, 17 are embodied as radial bearings, and the bearing 16 is embodied as an axial or thrust bearing. The thrust bearing 16 absorbs the axial operating forces of the extruder screws from the twin screw extruder, and conveys them into the gearbox housing 4.

The drive gear 12 of the reduction gearbox 1 is disposed between the gear 13 of the first output shaft 5 and a gear 18 that is fixedly connected with the first partial shaft 6 of the second output line. The gear 18 of the partial shaft 6 meshes with the drive gear 12 and has a tooth count $z18$ that is less than the tooth count $z13$ of the first gear 13 that is disposed in the first output line. This leads to a smaller gear ratio in this stage of the second output line. This novel feature effects the introduction of a smaller moment, in comparison to the output moment of the first output line, into the coupling 7 disposed in the second output line.

The coupling 7 is angularly movable and fixed against rotation, and connects the first partial shaft 6 with the second partial shaft 8. The coupling 7 is preferably embodied as a double toothed coupling, and comprises a coupling sleeve 19 that is provided at both ends with an inner toothing 20 and which extends over two coupling parts 21. A respective coupling part 21 is placed upon one of the facing ends of the partial shafts 6,8 respectively. The coupling parts 21 are held by an end disc 22 and a special screw 23. The coupling parts 21 are provided with a crowned outer toothing 24 that meshes with the inner toothing 20 of the coupling sleeve 19. This special geometry provides the required angular movability. The coupling 7 thereby pivots the second partial shaft 8 of the second output line by the angle $\alpha$ of the conicity of the screw shafts of the twin screw extruder into the required position of the second output shaft 9.

The special screws 23 have a lens-shaped head 25. A disc 26 extends between the ends of the partial shafts, transversely through the coupling sleeve 19, and is screwed thereto. This disc 26 delimits the axial play of the coupling 7 and reinforces the axial forces. The lens-shaped heads 25 of the special screws 23 form an axial support together with the disc 26.

The second partial shaft 8 is supported in the gearbox housing 4 by bearings 27, 28. A pinion 29 that is fixedly disposed on the second partial shaft 8 has $z29$ teeth and meshes with a gear 30 that is fixedly disposed on the second output shaft 9. Only in this stage is the torque, which is advantageously kept low for the coupling 7, increased to the required amount.

The second output shaft 9 is supported in the gearbox housing 4 by bearings 31, 32, 33 and 34. The bearings 32, 33, 34 are embodied as radial bearings, and the bearing 31 is embodied as an axial or thrust bearing. This thrust bearing 31, just like the thrust bearing 16 in the first output line, also absorbs the axial operating forces of the extruder screws from the twin screw extruder, and conveys these axial operating forces into the gearbox housing 4. In addition, the different configuration of the output lines makes it possible for the thrust bearings 16, 31, rather than being placed next to one another, to be placed to such an extent apart from one another that, due to the thereby possible selection of larger bearings, greater operating forces can also be absorbed. This circumstance also effects an increase of the capacity of the inventive gear mechanism for a conical twin screw extruder.

The positioning, selected with the inventive gear mechanism, of the shaft 11 that carries the drive gear 12, in interaction with the gears 13 and 18, enables the novel arrangement of the angularly movable and fixed coupling 7 within the distribution gearbox 3. The gear mechanism lubricant that is present in the gearbox housing 4 also lubricates the teeth engagement of the coupling 7.

The gear ratios of the second output line, which differ in the individual stages, and which when viewed over the entire distribution gearbox are, however, the same as the ratio of the gears of the first output line, produces the necessary installation space by the more spaced positioning of the partial shafts 6 and 8 relative to the closely spaced output shafts 5 and 9.

The gear 18 is press-fit onto the first partial shaft 6. For disassembly, or the radial adjustability during assembly, a plurality of lubricant channels 45 of an oil-hydraulic pressing system are disposed in the first partial shaft 6. A pump device can be connected from the outside onto the first partial shaft 6. This pump device produces in a hydraulic lubricant the pressure required, by radial expansion, to realize the press connection between the gear 18 and the first partial shaft 6. The desired radial position can be established by rotation. In this connection, critical for the radial adjustment is the orientation of the coupling toothings 10 of the output shafts 5 and 9 relative to one another. With the press connection realized, the second output shaft 9, since it also belongs to the output line of the pressing system, can be rotated into the desired position. As a result, the first partial shaft 6 is adjusted relative to the gear 18 that is in engagement with the drive gear 12. Alternatively, the pressing system can also be disposed in the first output line. It is not necessary to disassemble the distribution gearbox 3 and the reduction gearbox 1 for the radial adjustment.

Figure 2:
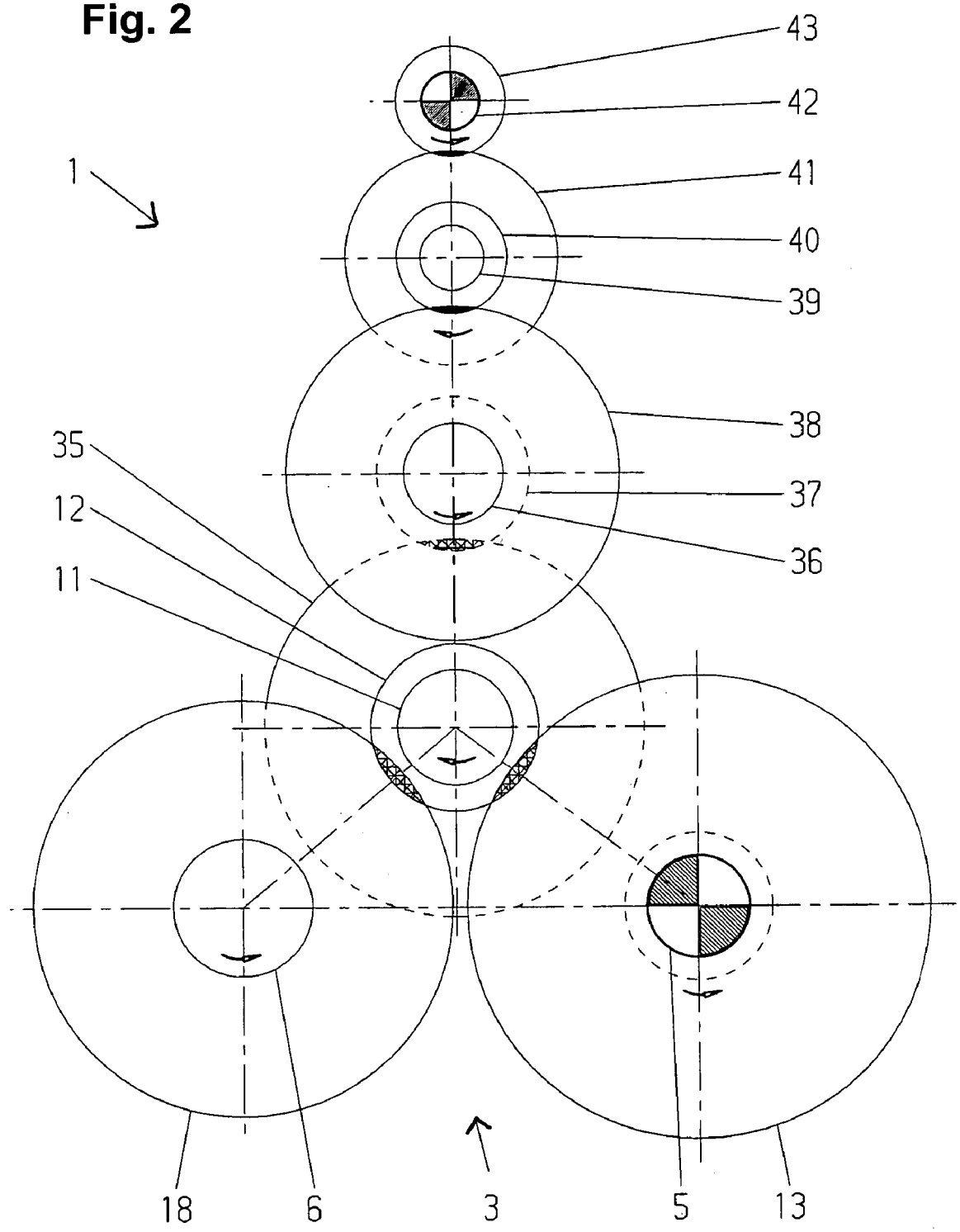
FIG. 2 shows the gear layout pursuant to the section line II—II in FIG. 1.

FIG. 2 shows the schematic gear layout of the overall gear mechanism. The first output shaft 5, the shaft 11 that carries the drive gear 12, and the first partial shaft 6 of the second output line belong, in the lower portion of the gear mechanism, to the distribution gearbox 3. The upper portion of the gear mechanism forms the shaft 11 that carries the drive gear 12 together with the reduction gearbox 1, which is embodied as a three-stage spur-gear system. The reduction gearbox comprises a gear 35 that is disposed on the shaft 11 and that meshes with a pinion 37 on a shaft 36. The shaft 36 carries a gear 38 that meshes with a pinion 40 on a shaft 39. The shaft 39 carries the gear 41 that is in engagement with a pinion 43 that is disposed on an input shaft 42 driven by the motor 2. As an effective variation, the input stage of the reduction gearbox having the input shaft 42 and the pinion 43 can also be configured by a bevel gear stage. In this connection, the stage formed by the pinion 43 and the gear 41 would be replaced by suitable bevel gears.

Figure 3:
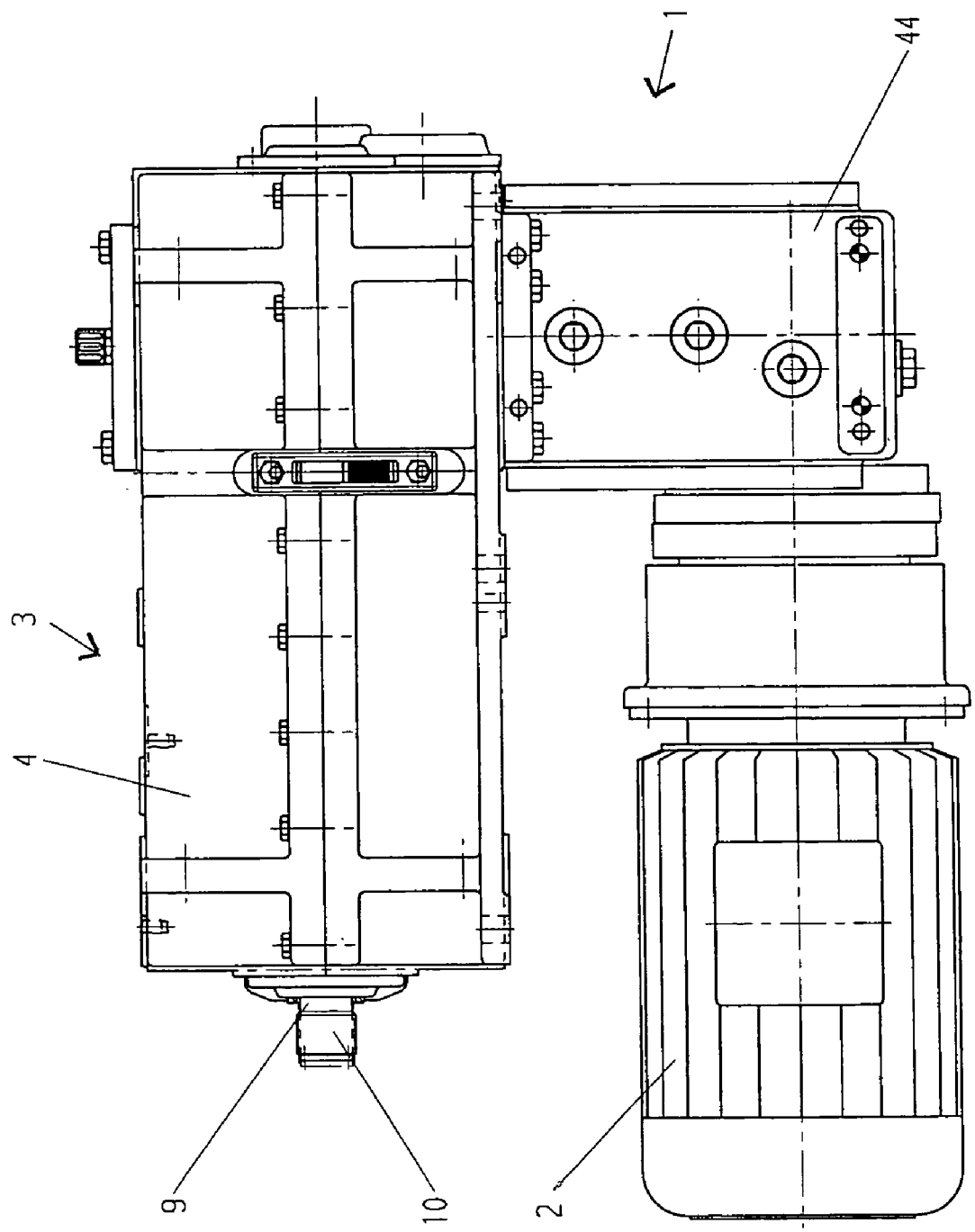
FIG. 3 shows the gearbox housing.

FIG. 3 shows an outer side view onto the housing of the gear mechanism. Here, the reduction gearbox 1 is disposed in the gearbox housing 4 below the distribution gearbox 3. In the transition between a housing part 44 of the gearbox 4 to the remaining gearbox housing 4 there is disposed a non-illustrated opening through which the connection of the third stage of the reduction gearbox 1 with the shaft 11 is established. The gearbox housing 4 with the housing part 44 forms a common interior space of a multi-part housing. Disposed in this common interior space are the distribution gearbox 3 and the reduction gearbox 1.

The motor 2 is disposed at the end of the input shaft 42. This shape of the housing also selectively offers the possibility of mounting the drive shaft 42, and hence the motor 2, on other side walls of the housing part 44. For this purpose, the embodiment having the bevel gear stage is advantageously to be selected. There also exists a possibility for a further effective variation where, in conformity with the gear outlay of FIG. 2, the reduction gearbox 1 is disposed above the distribution gearbox 3.

The specification incorporates by reference the disclosure of German priority document 10 2004 012 569.4 filed Mar. 12, 2004.

The present invention is, of course, in no way restricted to the specific disclosure of the specification and drawings, but also encompasses any modifications within the scope of the appended claims.

We claim:

1. A gear mechanism for a twin screw extruder having two screw shafts that are disposed at an angle to one another, said gear mechanism comprising:
    a multi-stage reduction gearbox;
    a distribution gearbox having two output lines connectable to said screw shafts, wherein a first output line comprises a first, through output shaft, wherein an angularly movable coupling, which is fixed against rotation, is disposed in a second output line, and wherein said second output line is placed at the angle of said screw shafts, relative to said first output line, via said coupling;
    a first gear fixedly disposed on said first output shaft;
    a second gear fixedly disposed on a first partial shaft of said second output line;
    a drive gear of said reduction gearbox, wherein said drive gear is disposed between, and is in engagement with, said first gear and said second gear; and
    a multi-part gearbox housing, wherein said reduction gearbox and said distribution gearbox are disposed, without spatial separation, in a common interior space of said multi-part gearbox housing.

2. A gear mechanism according to claim 1, wherein a gear ratio of said drive gear of said reduction gearbox is of a different magnitude to said first gear and said second gear of said two output lines of said distribution gearbox, and wherein drive torques that are to be transferred from said drive gear of said reduction gearbox are different for said first and second output lines of said distribution gearbox.

3. A gear mechanism according to claim 2, wherein said gear ratio of said drive gear of said reduction gearbox is less to said second gear than to said first gear, and wherein a torque that is introduced into said second output line, and hence into said angularly movable coupling, is less than a torque introduced into said first output line.

4. A gear mechanism according to claim 1, wherein said angularly movable coupling is embodied as a double toothed coupling.

5. A gear mechanism according to claim 1, wherein said angularly movable coupling is provided with a limitation of axial play.

6. A gear mechanism according to claim 1, wherein said first output shaft, and an output shaft of said second output line, are supported on thrust bearings, and wherein said thrust bearings are disposed in said gearbox housing such that they are axially offset relative to one another.

7. A gear mechanism according to claim 1, wherein at least one of said second gear and said first gear of said distribution gearbox is press-fit on its shaft and can be removably and radially positioned via an oil-hydraulic pressing system.

8. A gear mechanism according to claim 6, wherein toothings of pairings of pinions and gears in said distribution gearbox are embodied in a helically geared manner such that resulting axial forces of said toothings in said output shafts counteract axial operating forces from said twin screw extruder.

9. A gear mechanism according to claim 1, wherein said multi-stage reduction gearbox is composed of a plurality of spur gear stages.

10. A gear mechanism according to claim 1, wherein an input stage of said multi-stage reduction gearbox is a bevel gear stage.

11. A gear mechanism according to claim 1, wherein said reduction gearbox is disposed in a radially offset manner relative to said distribution gearbox.

* * * * *